(12) United States Patent
Gardner et al.

(10) Patent No.: US 9,853,838 B2
(45) Date of Patent: Dec. 26, 2017

(54) PODL SYSTEM WITH ACTIVE DV/DT AND DI/DT CONTROL

(71) Applicant: Linear Technology Corporation, Milpitas, CA (US)

(72) Inventors: Andrew J. Gardner, Santa Barbara, CA (US); David Dwelley, Santa Barbara, CA (US); Jeffrey L. Heath, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 356 days.

(21) Appl. No.: 14/712,855

(22) Filed: May 14, 2015

(65) Prior Publication Data
US 2015/0333935 A1 Nov. 19, 2015

Related U.S. Application Data

(60) Provisional application No. 61/993,526, filed on May 15, 2014.

(51) Int. Cl.
*H02M 3/158* (2006.01)
*H04L 12/10* (2006.01)
(Continued)

(52) U.S. Cl.
CPC ........ *H04L 25/0266* (2013.01); *H02M 3/156* (2013.01); *H02M 3/158* (2013.01);
(Continued)

(58) Field of Classification Search
None
See application file for complete search history.

(56) References Cited

U.S. PATENT DOCUMENTS

| 6,525,515 B1* | 2/2003 | Ngo .................. G05F 1/573 323/274 |
| 2008/0062586 A1* | 3/2008 | Apfel .................. H04L 12/10 361/18 |

(Continued)

FOREIGN PATENT DOCUMENTS

WO 20060138713 A1 12/2006

OTHER PUBLICATIONS

PCT/US15/31102, EPO as ISA, "International Search Report and Written Opinion", dated Aug. 20, 2015, 13 pages.

*Primary Examiner* — Jared Fureman
*Assistant Examiner* — Joel Barnett
(74) *Attorney, Agent, or Firm* — Patent Law Group LLP; Brian D Ogonowsky

(57) ABSTRACT

A Power Over Data Lines (PoDL) system includes Power Sourcing Equipment (PSE) supplying DC power and differential Ethernet data over a single twisted wire pair to a Powered Device (PD). Due to start-up perturbations, PD load current variations, and other causes, dV/dt noise is introduced in the power signal. Such noise may be misinterpreted as data unless mitigated somehow. Rather than increasing the values of the passive filtering components conventionally used for decoupling/coupling the power and data from/to the wire pair, active circuitry is provided in the PSE, PD, or both to limit dV/dt in the power signal. Such circuitry may be implemented on the same chip as the PSE controller or PD controller. Therefore, the sizes of the passive components in the decoupling/coupling networks may be reduced.

20 Claims, 2 Drawing Sheets

(51) Int. Cl.
*H04L 25/02* (2006.01)
*H02M 3/156* (2006.01)
*H02M 1/00* (2006.01)

(52) U.S. Cl.
CPC .......... *H04L 12/10* (2013.01); *H04L 25/0272* (2013.01); *H02M 2001/0029* (2013.01)

(56) References Cited

U.S. PATENT DOCUMENTS

| | | | | |
|---|---|---|---|---|
| 2010/0218003 A1* | 8/2010 | Blaha | ...................... | H04L 25/02 |
| | | | | 713/300 |
| 2011/0080209 A1* | 4/2011 | Kung | ...................... | H02M 1/36 |
| | | | | 327/538 |
| 2012/0269101 A1* | 10/2012 | Vexler | ................... | H04L 5/1423 |
| | | | | 370/276 |
| 2014/0211832 A1* | 7/2014 | Diab | ................. | H04L 25/0266 |
| | | | | 375/219 |

* cited by examiner

PODL SYSTEM WITH ACTIVE DV/DT AND DI/DT CONTROL

CROSS-REFERENCE TO RELATED APPLICATIONS

This application claims priority to U.S. provisional application Ser. No. 61/993,526, filed May 15, 2014, by Andrew J. Gardner et al, assigned to the present assignee and incorporated by reference.

FIELD OF THE INVENTION

This invention relates to Power over Data Line (PoDL) systems, where DC power is transmitted over a pair of differential data lines. The invention more particularly relates to techniques for actively limiting the power signal's dV/dt coupled to the wire pair, which will reduce the passive filtering requirements at the PHY terminals.

BACKGROUND

In PoDL, DC power from Power Sourcing Equipment (PSE) is transmitted over a single twisted wire pair. The same twisted wire pair also transmits/receives differential data signals. In this way, the need for providing any external power source for the Powered Devices (PDs) can be eliminated. The standards for PoDL are set out in IEEE 802.3 and are well-known.

A conventional PoDL system uses a coupling network to couple the DC power and AC data to the twisted wire pair at the output of the PSE and uses an identical network to decouple the DC power and AC data from the twisted wire pair at the PD.

FIG. 1 illustrates conventional coupling/decoupling networks between a PSE 10 and a PD 12 in an Ethernet PoDL system. The PSE 10 includes a DC voltage source 13 and may include a differential data transceiver. The differential data may also be generated by any other circuit. The differential data is applied to differential terminals of the physical layer (PHY) 14 for application to the twisted wire pair 16. The data portion of the PoDL system is not relevant to the present invention so is not described in detail.

The PD 12 includes a differential data portion that receives data from the PHY 18 terminals and processes the data accordingly. Such a data processing portion is not relevant to the invention. The PD load that receives the DC voltage and the data is represented by a resistor $R_{PD}$. A capacitor $C_{PD}$ helps smooth the voltage into the PD load. A DC-DC converter may be used in the PD to convert the received PoDL voltage to a target voltage for the PD load.

In the example of FIG. 1, DC power is delivered from the PSE 10 to the PD 12 through the single twisted wire pair 16 via a coupling network that conducts DC (or low frequency current), for power, between the DC voltage source 13 and the wire pair 16, while simultaneously blocking the differential AC data (or high frequency current) from the DC voltage source 13. Similarly, the PD 12 uses a decoupling network that decouples the transmitted DC voltage for powering the PD load, while conducting only the PHYs' AC data to data terminals in the PD 12. The ability of the coupling/decoupling networks to block the PHYs' AC data over a very broad range of frequencies is a key requirement for PoDL Ethernet applications where the data rates may vary from 100 Mbps to 1 Gbps. In the example of FIG. 1, the capacitors C1-C4 are intended to block DC in the data path, while the inductors L1-L4 are intended to block AC in the power path.

In FIG. 1, inductors L1-L4 are used to couple/decouple the DC flowing between the PSE 10 voltage source 13 and the PD 12 load to/from the wires 16. The inductors L1-L4 are AC blocking devices whose impedance is proportional to frequency. The constant of proportionality is referred to as the inductance L. The ability of a single inductor to impede AC over a broad range of frequencies depends on the magnitude of inductance, the inductor's ability to conduct DC current without losing its inductance, and its parasitic capacitance.

It is desirable to make the inductors L1-L4 the minimum size necessary to pass the power signal but block the AC data signals. Similarly, it is desirable to make the capacitors C1-C4 the minimum size necessary to block the power signal but pass the AC data signals. However, dV/dt noise in the power signal must also be blocked, and such dV/dt noise is fairly unpredictable. The dV/dt noise may affect data integrity. Therefore, the inductors L1-L4 and capacitors C1-C4 are typically larger than required to adequately pass or block the DC voltage and pass or block the AC data signals. Noise in the power signal may arise while the PSE being turned on, or from other equipment on the power supply bus, or from other sources.

Similarly, a rapid change in the PD load current (dI/dt) affects the voltage delivered by the PSE, where a high positive dI/dt will cause a rapid temporary decrease in the voltage, and where a high negative dI/dt will cause a rapid temporary increase in the voltage. Such dV/dt changes in voltage may affect data integrity.

Thus, what is needed in the field of PoDL is an improved network that combines or separates the power signal and the wide bandwidth AC data while limiting noise in the power signal caused by dV/dt or dI/dt.

SUMMARY

Various circuits, in either the PSE or the PD or both, are described that limit the time rate of change of the voltage in the power signal to reduce the possibility of adverse effects of noise in the power signal. The circuits are separate from the PSE's or PD's passive LC coupling/decoupling network. This eases the requirements for the inductors and capacitors in the PSE and PD coupling/decoupling networks, enabling much smaller passive components to be used (which are typically discrete components), resulting in reduced sizes and costs of the networks.

Accordingly, a PSE and/or a PD in a 1-Pair PoDL system is described that minimizes PHY transients, such as resulting from PSE start-up and/or PD load current changes, by actively controlling the time rate of change of the power signal. A PSE/PD with this feature results in a circuit that requires substantially smaller LC filters in order to deliver an equivalent level of performance.

BRIEF DESCRIPTION OF THE DRAWINGS

Elements that are the same or equivalent are labeled with the same numeral.

DETAILED DESCRIPTION

Figure 1:
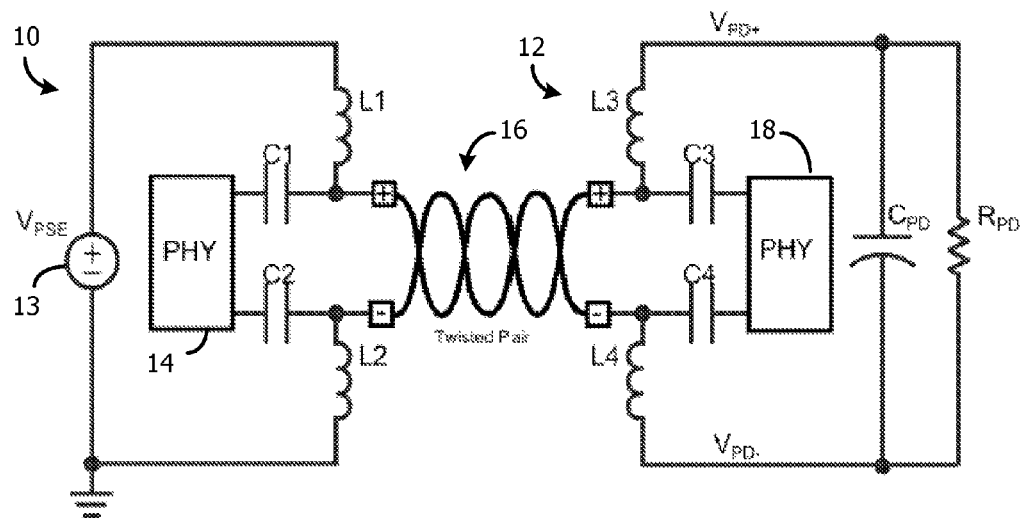
FIG. 1 illustrates a conventional PoDL-enabled Ethernet system using a single wire pair for supplying power and data to the PD.
Figure 2:
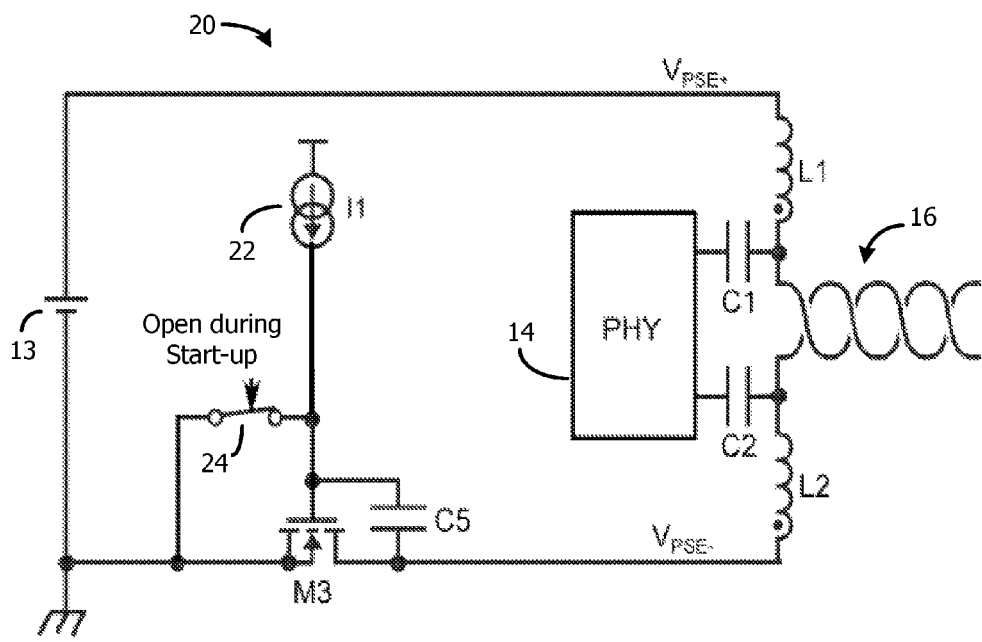
FIG. 2 illustrates a technique, in accordance with one embodiment of the invention, for pre-conditioning the power signal in the PSE during start-up to remove dV/dt noise prior to reaching the coupling/decoupling network.

FIG. 2 illustrates the power generating portion of a PSE 20 in a PoDL system. The PD (not shown) may be similar to the conventional PD 12 in FIG. 1, although the filter requirements in the PD's decoupling network of the PD are eased by the present invention. The differential data portion of the PoDL system is not relevant to the present invention and may be conventional.

An analysis of the PHYs' terminal voltage response to a change in the PSE voltage $dV_{PSE}/dt$ can assume one of three forms depending on the circuit's damping ratio: underdamped, critically damped, or over-damped, but at steady state it can be shown that:

$$V_{PHY} = \frac{dV_{PSE}}{dt} \times \frac{50\ \Omega \times C_{PHY}}{2},$$

where the impedance of the PHY is assumed to be 2×50Ω, and $C_{PHY}$ is the capacitance of the PHY's DC blocking capacitors C1-C4.

Hence a slew rate limitation on $dV_{PSE}/dt$ is required in order to constrain the magnitude of voltage perturbations at either PHY.

For the PSE, various circuit topologies may be used to limit the $dV_{PSE}/dt$ as needed in order to ensure that the magnitude of the resulting voltage transients at the PHY terminals are limited.

FIG. 2 illustrates circuit architecture in a PSE 20 where a low-side N-channel MOSFET M3 is enhanced with a pull-up current I1 by current source 22 only during start-up of the PSE 20, when variations in the power signal voltage occur. During start-up, the switch 24 is opened to allow the current I1 to pull-up the gate of the MOSFET M3 to ramp up its conductivity between ground and the bottom terminal of inductor L2. At start-up, the dV/dt at the drain of the MOSFET M3 is fairly large so current will be conducted by the capacitor C5 between the drain and the gate to reduce the percentage of the current from the current source 22 applied to the gate. This limits the turn on time of the MOSFET M3. As dV/dt is reduced (and the current into the capacitor C5 is reduced), the percentage of the current from the current source 22 applied to the gate is increased until the MOSFET M3 is completely turned on (i.e., $V_{PSE-}$ is approximately ground). Thus, capacitor C5 provides feedback from the drain of MOSFET M3 to the gate in order to limit dV/dt to less than approximately I(I1)/C5. This technique uses the well-known Miller effect for MOSFETs. The current source 22 or capacitor C5 can be selected to ramp up the conductivity of the MOSFET M3 at any desired rate to limit dV/dt. Limiting dV/dt preserves data integrity and eases the filtering requirements of the coupling/decoupling networks.

At the end of the start-up ramp, the switch 24 remains open and the current I1 fully turns on the MOSFET M3 to cause it to operate in its linear region. The capacitor C5 then acts as an open circuit. The closing of the switch 24 is for discharging the gate to turn off the MOSFET M3 to terminate the power signal to the PD. The added components may be fabricated on the same chip as the PSE controller, since capacitor C5 can be small.

Many other types of circuits may be used in place of the limiting circuit of FIG. 2 to limit the time rate of change of $V_{PSE-}$ or $V_{PSE+}$ during start-up or during any other time.

Further, if noise generated by the DC voltage source 13 is an issue, a voltage regulator may be included to smooth the voltage applied to the $V_{PSE+}$ and $V_{PSE-}$ terminals.

Figure 3A:
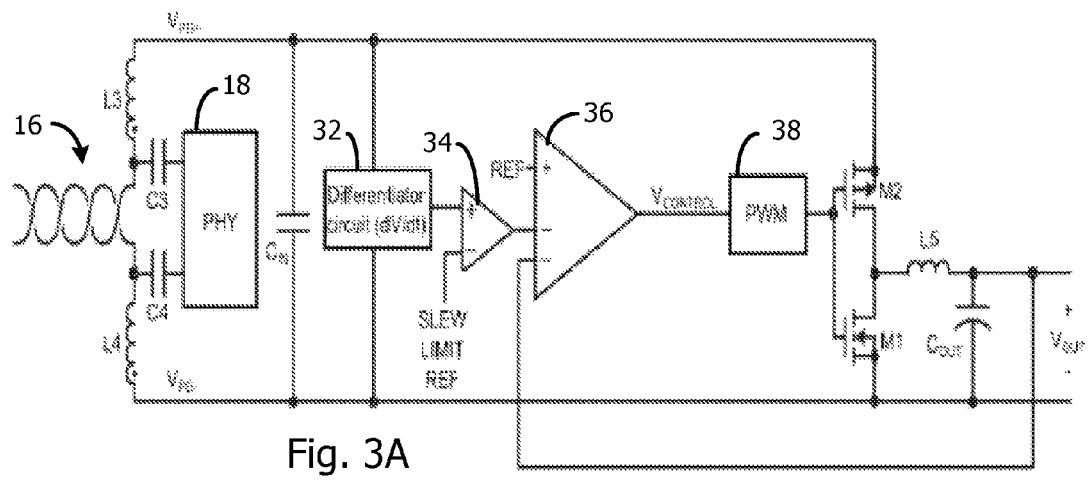
FIG. 3A illustrates a technique, in accordance with another embodiment of the invention, for limiting dV/dt at the PD due to dI/dt by the PD load to lower noise in the power signal.
Figure 4:
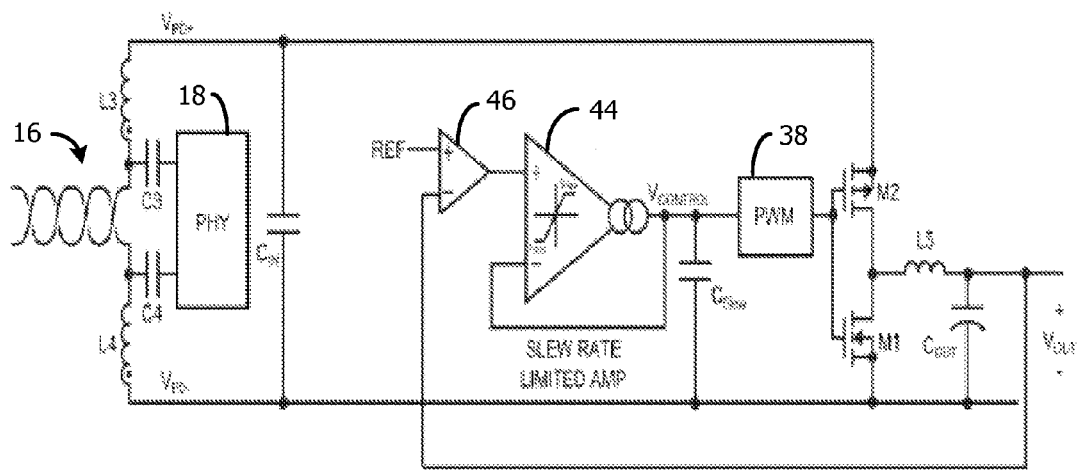
FIG. 4 illustrates another technique, in accordance with another embodiment of the invention, for limiting dV/dt at the PD due to dI/dt by the PD load to lower noise in the power signal.

FIGS. 3A and 4 show circuits that limit dV/dt at the PD, caused by rapid changes in the PD load current during or after start-up.

For a PD, the relationship between $V_{PD}$ (i.e., PD voltage after filtering by the decoupling network) and $V_{PHY}$ (i.e., voltage across the wire pair) is the same as for the $V_{PSE}$ and $V_{PHY}$. Ignoring the effects of parasitic resistance, the steady state relationship between $dV_{PD}/dt$ and PD current $I_{PD}$ is:

$$\frac{dV_{PD}}{dt} = -4L \times \frac{d^2 I_{PD}}{dt^2}$$

Hence, the second derivative of the PD current should be constrained in order to limit the magnitude of voltage transients seen at the PHYs' terminals.

Circuit architectures that limit the time rate of change in PD current offer a means of limiting PHY voltage transients.

FIG. 3A illustrates a circuit architecture where $dV_{PD}/dt$ in the PD 30 is limited. A PD load (not shown) is connected to the Vout terminals of a DC-DC converter. The converter converts the incoming PoDL voltage to a regulated target voltage (e.g., 5 volts) used by the PD load. Such a load may automatically go into or come out of a standby mode and quickly change its current. Such a rapid change in load current typically causes a rapid change in the PoDL voltage.

Figure 3B:
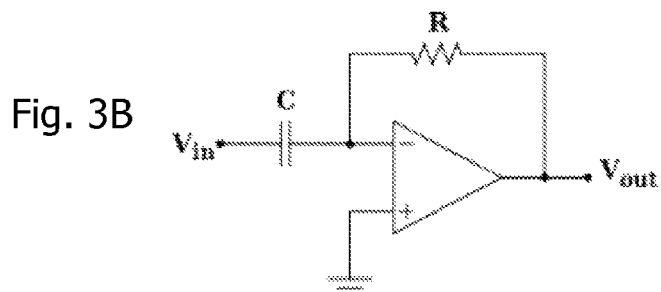
FIG. 3B illustrates a differentiator circuit that may be used in the circuit of FIG. 3A.

In FIG. 3A, an input capacitor $C_{IN}$ partially smoothes the voltage across the $V_{PD+}$ and $V_{PD-}$ lines. A differentiator circuit 32 detects the voltage across the $V_{PD+}$ and $V_{PD-}$ lines and outputs a voltage proportional to dV/dt. A common differentiator circuit is shown in FIG. 3B. The values of R and C in the circuit of FIG. 3B are adjustable to obtain the desired ratio of Vout vs dV/dt.

The output of the differentiator circuit 32 is differenced with respect to a fixed slew limit reference voltage (a threshold voltage) by a difference amplifier 34. The output of the amplifier 34 is fed into a negative input of a control amplifier 36 for a voltage-mode buck DC-DC converter, thus limiting the time rate of change of the converter's duty cycle so that the dV/dt of $V_{PD}$) does not exceed the threshold.

A fixed reference voltage REF is applied to the positive input of the control amplifier 36. The output voltage $V_{OUT}$ of the converter is applied to another negative input of the control amplifier 36.

The analog output of the control amplifier 36 acts as a control signal for a pulse width modulator (PWM) 38. The PWM 38 may be conventional and may compare the control voltage to a sawtooth waveform. When the PWM 38 output is low, the NMOS transistor M1 turns off and the PMOS transistor M2 turns on to start a new charging cycle for the inductor L5. An output capacitor $C_{OUT}$ smoothes the output of the converter for the PD load. By limiting the change in duty cycle, such as when the PD load comes out of a standby mode to draw more current, there will be a smoother ramp-up of current into the load, at the expense of rapid output voltage regulation, as the converter tries to increase the charging time of the inductor L5. This smoother ramp-up of current dynamically reduces dV/dt across the $V_{PD+}$ and $V_{PD-}$ lines so that the dV/dt of the $V_{PD+}$ and $V_{PD-}$ lines does not exceed a threshold limit. This limits the dI/dt (and $d^2I_{PD}/dt^2$) of the PD load current. Thus, changes in the PD load (e.g., going in or out of a standby mode) will have a limited effect on the dV/dt so that the filtering requirements for the decoupling components C3, C4, L3, and L4 are reduced.

Many other types of DC-DC converters may be used instead of the buck type shown in FIG. 3A.

As shown in FIG. 4, another approach to limiting $d^2I_{PD/dt}^2$ involves directly limiting the slew rate of the DC-DC converter's control voltage in order to limit the time rate of change of the PWM duty cycle. Assuming that changes in $V_{PD}$) are small due to changes in $I_{PD}$), the relationship between $d^2I_{PD}/dt^2$ and a buck DC-DC converter's duty cycle is approximately:

$$\frac{d^2 I_{PD}}{dt^2} = \frac{dDC}{dt} \times \frac{V_{PD}}{L5}$$

Hence, it can be seen that directly limiting the time rate of change of the converter's duty cycle may be sufficient for limiting the magnitude of voltage transients at the PHYs.

FIG. 4 illustrates a voltage-mode buck converter where the loop amplifier's control voltage slew rate is limited by a slew rate limited amplifier 44 in order to limit the time rate of change of the PWM duty cycle, where the duty cycle is proportional to the control voltage. The output voltage $V_{OUT}$ is applied to the negative input of the difference amplifier 46, and a fixed reference voltage REF is applied to the positive input. The output of the difference amplifier 46 represents the deviation of $V_{OUT}$ from a target voltage. The slew rate limited amplifier 44 is a transconductance amplifier that feeds back its output to its negative input terminal, and a slew capacitor $C_{SLEW}$ determines the maximum rate of change at the output. The output supplies the control voltage to the PWM 38 to determine the duty cycle of the DC-DC converter. By controlling the time rate of change of the duty cycle, the dV/dt of the power signal is limited. Thus, data integrity is maintained by the lowered dV/dt in the power signal not being passed by the DC blocking capacitors C3 and C4.

Many other types of circuits may be used to limit the slew rate of the duty cycle of the DC-DC converter in the PD to prevent sudden changes in the PD load from resulting in a problematic dV/dt in the power signal.

The terms PSE and PD are used throughout this disclosure to identify equipment that supplies power and equipment that receives the power, and such equipment/devices are not limited to Ethernet equipment/devices unless specified.

While particular embodiments of the present invention have been shown and described, it will be obvious to those skilled in the art that changes and modifications may be made without departing from this invention in its broader aspects and, therefore, the appended claims are to encompass within their scope all such changes and modifications.

What is claimed is:

1. A Power over Data Lines (PoDL) system, which enables power and differential data transmission over a single wire pair, comprising:
    a passive coupling network in Power Sourcing Equipment (PSE) coupled to the wire pair for coupling a DC power signal and differential data to the wire pair;
    a passive decoupling network in a Powered Device (PD) coupled to the wire pair for decoupling the DC power signal and differential data from the wire pair;
    a PD load powered by the DC power signal; and
    dV/dt limiting circuitry, separate from the passive coupling network and the passive decoupling network, comprising one or more active components, wherein the dV/dt limiting circuitry limits dV/dt in the power signal, the dV/dt limiting circuitry being configured to limit the dV/dt of the DC power signal at all currents drawn by the load.

2. The system of claim 1 wherein the dV/dt limiting circuitry comprises:
    a transistor in series with a power signal line in the PSE; and
    a control circuit in the PSE responsive to dV/dt on the power signal line, wherein the control circuit controls a conductivity of the transistors in response to the dV/dt such that the dV/dt is limited.

3. The system of claim 2 wherein the control circuit comprises a capacitor having a first terminal coupled to the power signal line and a second terminal coupled to a control terminal of the transistor.

4. The system of claim 3 further comprising a current source supplying current to the control terminal of the transistor, wherein the capacitor diverts current from the current source to limit the dV/dt.

5. The system of claim 1 wherein the PD includes a DC-DC converter for converting incoming PoDL voltage to a target voltage for the PD load, wherein the dV/dt limiting circuitry comprises:
    a duty cycle slew rate limiting circuit coupled to the DC-DC converter for limiting a slew rate of the duty cycle of the converter in response to changes in PD load current, thus reducing a dI/dt into the PD load, resulting in a reduced dV/dt in the power signal.

6. The system of claim 5 wherein the duty cycle slew rate limiting circuit comprises:
    a differentiator circuit that outputs a first signal proportional to dV/dt in the power signal; and
    a DC-DC converter controller circuit that receives a first feedback signal corresponding to an output voltage of the converter and regulates the output voltage to be a target voltage,
    wherein the first signal is provided to the converter controller to limit the dV/dt to a maximum value by limiting the slew rate of the duty cycle of the converter in response to changes in the PD load.

7. The system of claim 5 wherein the duty cycle slew rate limiting circuit comprises:
    a slew rate limited differential amplifier, wherein the slew rate limited differential amplifier outputs a control signal in the converter that controls the duty cycle.

8. The system of claim 7 comprises a second differential amplifier receiving a voltage corresponding to an output voltage of the converter and receiving a reference voltage, wherein an output of the second differential amplifier is coupled to an input of the slew rate limited differential amplifier.

9. The system of claim 8 wherein the slew rate limited differential amplifier comprises a capacitor coupled to its output, where the output is coupled to an input of the slew rate limited differential amplifier.

10. The system of claim 1 wherein the dV/dt limiting circuitry limits dI/dt into the PD load.

11. The system of claim 1 wherein the passive coupling network and the passive decoupling network comprises:
   inductors for passing the power signal but blocking the differential data; and
   capacitors for passing the differential data but blocking the power signal.

12. The system of claim 1 wherein the DC power signal is generated by a voltage source in the PSE.

13. The system of claim 1 wherein the differential data comprises Ethernet data.

14. The system of claim 1 wherein the dV/dt limiting circuitry comprises $d^2I/dt^2$ limiting circuitry in the PD that limits PD load current variations.

15. A Power over Data Lines (PoDL) system, which enables power and differential data transmission over a single wire pair, comprising:
   a passive coupling network in Power Sourcing Equipment (PSE) coupled to the wire pair for coupling a DC power signal and differential data to the wire pair;
   a passive decoupling network in a Powered Device (PD) coupled to the wire pair for decoupling the DC power signal and differential data from the wire pair;
   a PD load powered by the DC power signal; and
   $d^2I/dt^2$ limiting circuitry, separate from the passive coupling network and the passive decoupling network, comprising one or more active components, wherein the $d^2I/dt^2$ limiting circuitry limits dV/dt in the DC power signal, the $d^2I/dt^2$ limiting circuitry being configured to limit the dV/dt in the DC power signal at all currents drawn by the load.

16. The system of claim 15 wherein the PD includes a DC-DC converter for converting incoming PoDL voltage to a target voltage for the PD load, wherein the $d^2I/dt^2$ limiting circuitry comprises:
   a duty cycle slew rate limiting circuit coupled to the DC-DC converter for limiting a slew rate of the duty cycle of the converter in response to changes in PD load current, thus reducing a dI/dt into the PD load, resulting in a reduced dV/dt in the power signal.

17. The system of claim 16 wherein the duty cycle slew rate limiting circuit comprises:
   a differentiator circuit that outputs a first signal proportional to dV/dt in the power signal; and
   a DC-DC converter controller circuit that receives a first feedback signal corresponding to an output voltage of the converter and regulates the output voltage to be a target voltage,
   wherein the first signal is provided to the converter controller to limit the $d^2I/dt^2$ to a maximum value by limiting the slew rate of the duty cycle of the converter in response to changes in the PD load.

18. The system of claim 16 wherein the duty cycle slew rate limiting circuit comprises:
   a slew rate limited differential amplifier, wherein the slew rate limited differential amplifier outputs a control signal in the converter that controls the duty cycle.

19. The system of claim 18 wherein the slew rate limited differential amplifier comprises a capacitor coupled to its output, where the output is coupled to an input of the slew rate limited differential amplifier.

20. The system of claim 15 wherein the $d^2I/dt^2$ limiting circuitry limits dI/dt into the PD load.

* * * * *